United States Patent
Yamamoto et al.

(10) Patent No.: US 7,459,213 B2
(45) Date of Patent: Dec. 2, 2008

(54) SILICONE COMPOSITION AND A PAPER TREATMENT AGENT COMPRISING THE SAME

(75) Inventors: Kenji Yamamoto, Gunma (JP);
Masahiko Ogawa, Gunma (JP);
Tsutomu Nakajima, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 243 days.

(21) Appl. No.: 10/762,462

(22) Filed: Jan. 23, 2004

(65) Prior Publication Data

US 2004/0152825 A1 Aug. 5, 2004

(30) Foreign Application Priority Data

| | | | |
|---|---|---|---|
| Jan. 24, 2003 | (JP) | ............................. | 2003-016621 |
| Jan. 30, 2003 | (JP) | ............................. | 2003-022759 |
| Oct. 16, 2003 | (JP) | ............................. | 2003-356119 |
| Oct. 16, 2003 | (JP) | ............................. | 2003-357041 |

(51) Int. Cl.
*C08L 29/05* (2006.01)

(52) U.S. Cl. ...................... 428/447; 524/503; 524/506; 525/58

(58) Field of Classification Search .................. 525/58; 524/503, 506; 428/447
See application file for complete search history.

(56) References Cited

U.S. PATENT DOCUMENTS

| | | | | |
|---|---|---|---|---|
| 4,624,900 A | * | 11/1986 | Fau | ............................. 428/447 |
| 4,791,029 A | | 12/1988 | Fau et al. | |
| 5,616,672 A | | 4/1997 | O'Brien et al. | |
| 5,777,017 A | | 7/1998 | Funk et al. | |
| 5,817,717 A | * | 10/1998 | Lievre et al. | ................... 525/58 |

FOREIGN PATENT DOCUMENTS

| | | | |
|---|---|---|---|
| JP | 2000-87013 A | | 3/2000 |
| JP | 2001-98033 A | | 4/2001 |
| JP | 2002-220539 A | | 8/2002 |

OTHER PUBLICATIONS

English language translation DE 24 49 085, Apr. 1976.*
Webster's Dictionary, definition of "cardboard".*

* cited by examiner

*Primary Examiner*—Margaret G Moore
(74) *Attorney, Agent, or Firm*—Birch, Stewart, Kolasch & Birch, LLP

(57) ABSTRACT

A composition comprising the following components:
  100 parts by weight of an organopolysiloxane (A),
  0.1 to 30 parts by weight of a crosslinking agent (B),
  50 to 1,000 parts by weight of a polyvinyl alcohol homopolymer or copolymer (C),
  0 to 5 parts by weight, as an active ingredient, of a catalyst (D),
  100 to 100,000 parts by weight of water (E), and
  0.1 to 100 parts by weight of a surfactant (F), wherein component (A) is an organopolysiloxane (A3) having at least two alkenyl groups and represented by the following formula (3):

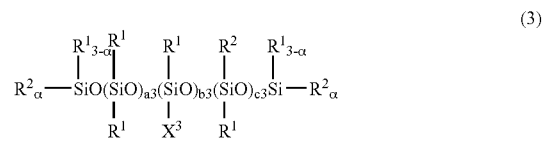

(3)

wherein each $R^1$ may be same or different and is a group having 1 to 20 carbon atoms selected from the group consisting of alkyl groups, alicyclic groups, and aryl groups, whose hydrogen atoms bonded to the carbon atoms may partly be replaced with a halogen atom or a cyano group, R2 is an alkenyl group and $X^3$ is the group represented by the following formula:

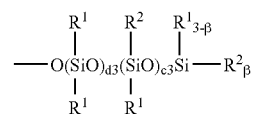

wherein a3, b3, c3, d3 and e3 are such numbers that the organopolysiloxane (A3) has a viscosity at 25 degrees C. of from 0.05 to 500 Pa·s, and b3, c3, d3 and e3 may be zero, and α and β are integers of from 0 to 3 and component (B) is an organohydrogenpolysiloxane (B3) having at least three SiH groups per molecule.

11 Claims, No Drawings

SILICONE COMPOSITION AND A PAPER TREATMENT AGENT COMPRISING THE SAME

CROSS REFERENCES

This application claims the benefits of Japanese Patent application No. 2003-016621 filed on Jan. 24, 2003, Japanese Patent application No. 2003-022759 filed on Jan. 30, 2003, Japanese Patent application No. 2003-356119 filed on Oct. 16, 2003, and Japanese Patent application No. 2003-357041 filed on Oct. 16, 2003, the contents of which are hereby incorporated by reference.

FIELD OF THE INVENTION

This invention relates to a silicone composition and a paper treatment agent comprising the composition which is suitable to provide a paper substrate with water repellency and oil repellency.

DESCRIPTION OF THE PRIOR ART

Wrapping paper for food, food containers, and cooking paper are provided with water repellency, oil repellency to prevent oily or aqueous ingredients of the food from permeating the paper to soil its surroundings. The paper is provided also with non-tackiness to prevent the food from sticking to the paper to be deformed or broken when the food is taken out.

To provide the water repellency, oil repellency and non-tackiness, various kinds of compounds having a perfluoroalkyl group have been used. Among such compounds, polymers made of monomers having a perfluoroalkyl group are known. The polymer is added in a form of an aqueous dispersion in a paper making process, which is called an internal addition method, or the polymer is dissolved in a treatment solution in which paper is to be soaked, which is called an external addition method.

Concerning these methods, Japanese Patent Application Laid-Open, hereinafter referred to as JPA, No. 10-7738 describes improvement on solubility. JPA No. 2000-169735 describes a treatment method to prevent decrease in oil repellency. JPA No. 2001-98033 describes improvement of secondary processability. JPA 2002-220539 describes improvement on adhesion to paper.

Another method is known where use is made of an amine salt of a phosphate ester having a perfluoroalkyl group. This salt has been used as widely as the aforesaid polymer. JPA No. 64-6196 and JPA No. 56-138197 describe improvement on stability of dispersion. JPA No. 2000-87013 and JPA No. 2000-144120 describe improvement on storage stability.

However, use of the aliphatic fluorohydrocarbon atoms is restricted because they are ozone-depleting or globe-warming substances. Use of fluorine compounds having similar structures as the aliphatic flurohydrocarbon atoms may be restricted in the near future due to environmental concerns. In food application, too, possibility has been pointed out that a trace amount of hazardous substances containing fluorine occurs in cooking with a microwave oven. Similar possibility has been pointed out that hazardous substances containing fluorine such as hydrogen fluoride are exhausted in incineration of waste paper.

In the aforesaid background, it is desired to provide paper with water repellency, oil repellency and non-tackiness without using the compound having a perfluoroalkyl group. As a subsititute for the compound having a perfluoroalkyl group, a resin of polyvinyl alcohol, hereinafter referred to as PVA, has been used. Since the resin is highly hydrophilic, it gives good oil repellency to paper. On the other hand, it is difficult for the resin to give water repellency or non-tackiness due to its hydrophilicity.

Meanwhile, silicones has been used to attain water repellency and non-tackiness. Therefore, using the silicone in combination with the PVA resin may substitute for the compound having a perfluoroalkyl group. However, the former is hydrophobic and the latter is hydrophilic, so that it is difficult to obtain a homogeneous or a stable mixture merely by mixing the both.

Thus, an object of the present invention is to provide a stable composition comprising a silicone compound and a PVA resin. Another object of the present invention is to provide paper such as craft paper, high quality paper and corrugated cardboard, with oil repellency and water repellency by treatment with an agent comprising the composition.

SUMMARY OF THE INVENTION

The present inventors have made an intensive study to found that a stable composition can be obtained by mixing a specific organopolysiloxane (A) and a polyvinyl alcohol homopolymer or copolymer (C) in a specific ratio, and that paper treated with the composition has good water repellency, oil repellency, and non-tackiness. It has also been found that higher water repellency, oil repellency, and non-tackiness can be attained by applying to paper a composition comprising a specific organopolysiloxane (A) and a specific cross-linking agent (B), a polyvinyl alcohol homopolymer or copolymer (C), optionally a silane having a hydrolyzable group or a condensate thereof, and curing the paper.

Thus, the present invention is a composition comprising the following components:

100 parts by weight of an organopolysiloxane (A), 50 to 1,000 parts by weight of a polyvinyl alcohol homopolymer or copolymer (C), 100 to 100,000 parts by weight of water (E), and 0.1 to 100 parts by weight of a surfactant (F), wherein component (A) is an organopolysiloxane (A1) represented by the following average compositional formula (1):

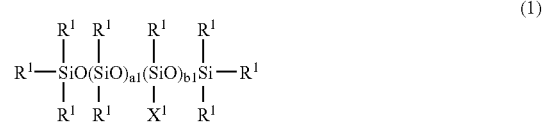

wherein each $R^1$ may be same or different and is a group having 1 to 20 carbon atoms selected from the group consisting of alkyl groups, alicyclic groups, and aryl groups, whose hydrogen atoms bonded to the carbon atoms may partly be replaced with a halogen atom or a cyano group, and $X^1$ is the group represented by the following formula:

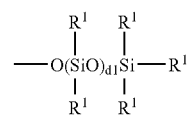

wherein a1, b1 and d1 are such numbers that the organopolysiloxane (A1) has a viscosity at 25 degrees C. of from 0.05 to 500 Pa·s, and b1 and d1 may be zero.

The present invention is a composition comprising the following components:

100 parts by weight of an organopolysiloxane (A),
0.1 to 30 parts by weight of a crosslinking agent (B),
50 to 1,000 parts by weight of a polyvinyl alcohol homopolymer or copolymer (C),
0 to 5 parts by weight, as an active ingredient, of a catalyst (D),
100 to 100,000 parts by weight of water (E), and
0.1 to 100 parts by weight of a surfactant (F), wherein component (A) is an organopolysiloxane (A2) having at least two hydroxyl groups and represented by the following average compositional formula (2)

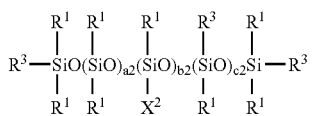
(2)

wherein each $R^1$ may be same or different and is a group having 1 to 20 carbon atoms selected from the group consisting of alkyl groups, alicyclic groups, and aryl groups, whose hydrogen atoms bonded to the carbon atoms may partly be replaced with a halogen atom or a cyano group, $R^3$ is a hydroxyl group, and $X^2$ is the group represented by the following formula:

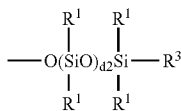

wherein a2, b2, c2 and d2 are such numbers that the organopolysiloxane (A2) has a viscosity at 25 degrees C. of from 0.05 to 500 Pa·s, and b2, c2 and d2 may be zero, and component (B) is an organopolysiloxane (B2) having at least three SiH or other hydrolyzable groups per molecule.

The present invention is a composition comprising the following components:

100 parts by weight of an organopolysiloxane (A),
0.1 to 30 parts by weight of a crosslinking agent (B),
50 to 1,000 parts by weight of a polyvinyl alcohol homopolymer or copolymer (C),
0 to 5 parts by weight, as an active ingredient, of a catalyst (D),
100 to 100,000 parts by weight of water (E), and
0.1 to 100 parts by weight of a surfactant (F), wherein component (A) is an organopolysiloxane (A3) having at least two alkenyl groups and represented by the following formula (3):

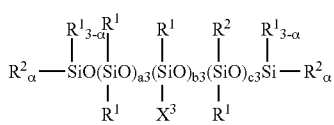
(3)

wherein each $R^1$ may be same or different and is a group having 1 to 20 carbon atoms selected from the group consisting of alkyl groups, alicyclic groups, and aryl groups, whose hydrogen atoms bonded to the carbon atoms may partly be replaced with a halogen atom or a cyano group, R2 is an alkenyl group and $X^3$ is the group represented by the following formula:

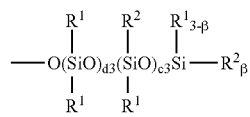

wherein a3, b3, c3, d3 and e3 are such numbers that the organopolysiloxane (A3) has a viscosity at 25 degrees C. of from 0.05 to 500 Pa·s, and b3, c3, d3 and e3 maybe zero, and α and β are integers of from 0 to 3 and component (B) is an organohydrogenpolysiloxane (B3) having at least three SiH groups per molecule.

The present compositions are comparatively harmless to the environment, while they provide paper with as good properties as those provided by the compounds having a perfluoroalkyl group. Further, the present compositions need not contain any organic solvent and, therefore, do not cause the environmental problems or danger associated with the solvents. Still further, paper products treated with any one of the present compositions are easy to recycle and place a less burden on the environment.

DESCRIPTION OF THE PREFERRED EMBODIMENTS

In the present invention, commercially available paper can be used, such as craft paper, high quality paper, liner, and corrugated cardboard, those substantially made from natural fibers such as Manila hemp, paper mulbery, Edgeworthia papyrifera, and those substantially made from synthetic fibers such as polyethylene terephtalate, the one under the trade name of Vinylon, and acrylic fiber.

The first composition of the present invention comprises the organopolysiloxane (A1) represented by the following average compositional formula (1) as component (A).

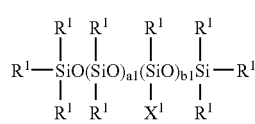
(1)

wherein each $R^1$ may be same or different and is a group having 1 to 20 carbon atoms selected from the group consisting of alkyl groups such as a methyl group, an ethyl group, a propyl group, and a butyl group; alicyclic groups such as a cyclohexyl group, and aryl groups such as a tolyl group. A part of the hydrogen atoms bonded to the carbon atoms of the group may be replaced with a halogen atom or a cyano group. Preferably, at least 80% of $R^1$ in the organopolysiloxane (A1) is a methyl group. The $R^1$ group with a part of the hydrogen atoms bonded to the carbon atoms being replaced with a halogen atom preferably has 1 to 5 carbon atoms.

In the formula (1), $X^1$ is the group represented by the following formula:

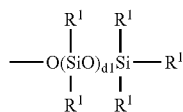

wherein $R^1$ is as defined above and a1, b1 and d1 are such numbers that the organopolysiloxane (A1) has a viscosity at 25 degrees C. of from 0.05 to 500 Pa·s, preferably from 0.1 to 100 Pa·s. The numbers, b1 and d1, may be zero. If the viscosity is below the aforesaid lower limit, it may be difficult to provide paper with sufficient non-stickiness. If the viscosity is above the aforesaid upper limit, it maybe difficult to homogeneously disperse organopolysiloxane (A1) in the composition. Preferably, a1, b1 and d1 satisfy the inequality, $28 \leq a1+b1 \times (d1+1) \leq 2,000$.

The aforesaid first composition of the present invention does not require a curing process and, therefore, is advantageously used when it is desired to give paper the water repellency and oil repellency in a short period of time in a simple process.

The second composition of the present invention comprises, as component (A), the organopolysiloxane (A2) having at least two hydroxyl groups per molecule represented by the following average compositional formula (2):

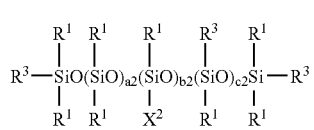

wherein $R^1$ is as defined above. $R^3$ represents a hydroxyl group and $X^2$ is a group represented by the following formula:

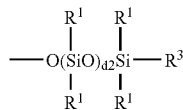

wherein $R^1$ is as defined above and, a2, b2, c2 and d2 are such numbers that a viscosity at 25 degrees C. of the organopolysiloxane (A2) ranges from 0.05 to 500 Pa·s, preferably from 0.1 to 100 Pa·s, and b2, c2 and d2 may be zero. Preferably, a2, b2 c2 and d2 satisfy the inequality, $28 \leq a2+b2 \times (d2+1)+c2 \leq 2,000$.

The hydroxyl groups of the organopolysiloxane (A2) react with the crosslinking agent (B2) described below to from a cured film. The organopolysiloxane (A2) should have at least two hydroxyl groups per molecule. If the number of the hydroxyl groups is less than two, water repellency of paper treated with such a composition tends to worsen with time, which is undesirable. Preferably, in formula (2), the number of the hydroxyl groups per molecule, b2+c2+2, ranges from 2 to 150, and the amount of the hydroxyl groups per 100 g of the organopolysiloxane (A2) rages from 0.0001 mole to 0.1 mole. If the amount is less than the aforesaid lower limit, the water repellency may worsen with time. If the amount exceeds the aforesaid upper limit, a pot life of such a composition tends to be shorter.

The crosslinking agent (B) which is to react with the organopolysiloxane (A2) into condensation is the organopolysiloxane (B2) having at least three SiH groups or other hydrolyzable groups. The organopolysiloxane (B2) is used in such an amount that a molar amount of the SiH or the hydrolyzable group is 5 to 200 times as much as a molar amount of the hydroxyl groups in the organopolysiloxane (A2). Typically, The organopolysiloxane (B2) is used in an amount of from 0.1 to 30 parts by weight per 100 parts by weight of the organopolysiloxane (A2). If the amount of the SiH or the hydrolyzable group is less than the aforesaid lower limit, a sufficient amount of the crosslinkage may not be obtained and, accordingly, sufficient water repellency or non-tackiness may not be provided to paper.

If the amount of the SiH or the hydrolyzable group is more than the aforesaid upper limit, proportional increase of the effects may not be attained and, therefore, cost performance worsens. Moreover, gels may be formed during storage of such a composition.

The organopolysiloxane (B2) having SiH groups is represented by the compositional formula $R^1_f H_g SiO_{(4-f-g)/2}$, wherein $R^1$ is as defined above for the average compositional formula (2), f and g are numbers with $0 \leq f \leq 3$, $0 < g \leq 3$, and $1 \leq f+g \leq 3$. As to the structure of the organopolysiloxane (B2), it must have at least three SiH groups in a molecule, but there is no other requirement. The organopolysiloxane (B2) may be linear, branched or cyclic and have a viscosity of from several mPa·sec to several tens Pa·sec.

Examples of the organopolysiloxane (B2) having SiH groups are as shown below.

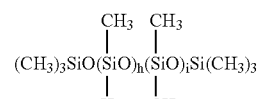

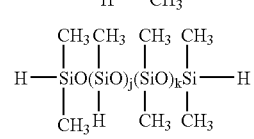

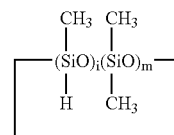

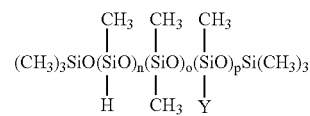

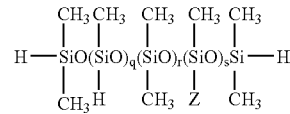

In the above formulae, Y and Z are groups represented by the following formulae, and h to w are numbers as follows: h, 1 and n are numbers of from 3 to 500; m, p, and s are numbers of from 1 to 500; and i, j, k, o, q, r, t, u, v and w are numbers of from 0 to 500.

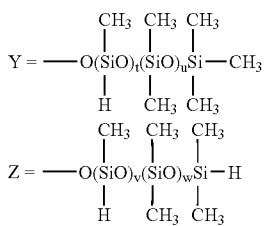

The organopolysiloxane (B2) having hydrolyzable groups is represented by the compositional formula $R^1_f W_g SiO_{(4-f-g)/2}$, wherein $R^1$ is as defined above for the average compositional formula (2), W is a hydrolyzable group, f and g are numbers with $0 \leq f \leq 3$, $0 < g \leq 3$, and $1 \leq f+g \leq 3$. As to the structure of the organopolysiloxane (B2), it must have at least three SiH groups in a molecule, but there is no other requirement. The organopolysiloxane (B2) may be linear, branched or cyclic and have a viscosity of from several mPa·sec to several tens Pa·sec.

Examples of the hydrolyzable groups include alkoxy groups such as a methoxy group, an ethoxy group, a propoxy group, a butoxy group, a methoxyethoxy group, and an isopropenoxy group; acyloxy groups such as an acetoxy group; amino groups such as an ethylamino group; amido groups; oxime groups such as an ethylmethylbutanoxime group.

Examples of the organopolysiloxane (B2) are as shown below.

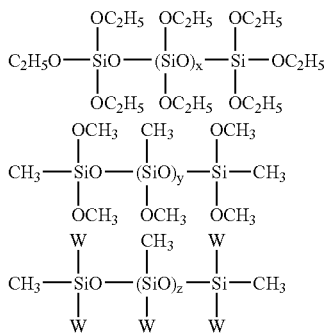

wherein W means a hydrolyzable group such as $CH_3COO\text{—}$, $CH_3(C_2H_5)C\text{=}NO\text{—}$, $(C_2H_5)_2N\text{—}$, $CH_3CO(C_2H_5)N\text{—}$, and $CH_2\text{=}(CH_3)C\text{—}O\text{—}$, and x, y, and z are integers of from 0 to 500.

The organopolysiloxane (A2) can be reacted with (B2) without any catalyst, but, the catalyst (D2) may be used in severe reaction conditions such as a restricted heating temperature. Examples of preferred catalyst (C2) include acids such as hydrochloric acid, phosphoric acid, methanesulfonic acid, p-toluenesulfonic acid, maleic acid, and trifluoroacetic acid; alkalis such as sodium hydroxide, potassium hydroxide, sodium ethoxide, and tetraethylammonium hydroxide; salts such as ammonium chloride, ammonium acetate, ammonium fluoride, and sodium carbonate; salts of organic acids with metals such as magnesium, aluminum, zinc, iron, zirconium, cerium, and titanium; chelate compounds such as zinc dioctate and zirconium tetraacetylacetonate; and metal alkoxides such as titanium tetraisopropoxide and aluminum tributoxide.

The aforesaid catalyst may be used in an effective amount, that is, at least a minimum amount enough to react (A2) with (B2). The effective amount may vary depending on reaction conditions, a desired curing speed and so on, but, is typically in the range of from 0.1 to 5 weight % as an active ingredient, based on a total weight of (A2) and (B2).

The third composition of the present invention comprises the organopolysiloxane (A3) having at least two alkenyl groups per molecule, represented by the following average compositional formula.

(3)

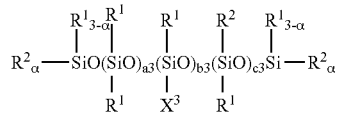

wherein, $R^1$ is as defined for the formula (1), and, preferably, 80% of $R^1$ is a methyl group. $R^2$ represents an alkenyl group, preferably a vinyl group. $X^3$ is a group represented by the following formula:

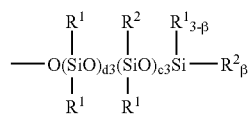

wherein, $R^1$ is as defined above, and a3, b3, c3, d3, and e3 are such numbers that the organopolysiloxane (A3) has a viscosity at 25 degrees C. of from 0.05 to 500 Pa·s, preferably from 0.1 to 100 Pa·s, and b3, c3, d3, and e3 may be zero. In the formula, α and β are integers of from 0 to 3. Preferably, a3, b3, c3, d3 and e3 satisfy the inequality, $28 \leq a3+b3 \times (d3+e3+1)+c3 \leq 2,000$.

The alkenyl groups of the organopolysiloxane (A3) react with the crosslinking agent (B3) to form a cured film. The organopolysiloxane (A3) should have at least two alkenyl groups per molecule. If the number of the alkenyl groups is less than two, water repellency of paper treated with such a composition tends to worsen with time, which is undesirable.

Preferably, in the formula (3), the number of the alkenyl groups per molecule, $b3 \times (e3+\alpha)+c3+2 \times \alpha$, ranges from 2 to 150, and an amount of the alkenyl groups per 100 g of the organopolysiloxane (A3) ranges from 0.001 mole to 0.1 mole. If the amount is less than the aforesaid lower limit, the water repellency of paper may worsen with time. If the amount exceeds the aforesaid upper limit, it may be difficult to give paper sufficient non-tackiness.

The crosslinking agent (B3) is the organohydrogenpolysiloxane (B3) having at least three SiH groups. The crosslinking agent (B3) may be the same as the organopolysiloxane (B2) having at least three SiH groups as described above. The crosslinking agent (B3) is used in such an amount that a molar amount of SiH is in the range of from 1 to 5 times as much as a molar amount of the alkenyl groups in the organopolysiloxane (A3). Typically, the organopolysiloxane (B3) is used in an amount of from 0.1 to 30 parts by weight, preferably 0.1 to 20 parts by weight, per 100 parts by weight of the organopolysiloxane (A3). If the amount of the SiH is below the aforesaid lower limit, sufficient crosslinkage may not be formed by addition of the alkenyl groups with SiH and it may be difficult to give paper sufficient water repellency or non-tackiness. If the amount is above the aforesaid upper limit, proportional increase of the effects may not be attained and, therefore, cost performance worsens. Moreover, gels may be formed during storage of such a composition.

Examples of the catalyst (D3) used for the reaction of the organopolysiloxane (A3) with the crosslinking agent (B3) include platinum black, chloroplatinic acid, a complex of chloroplatinic acid and an olefin, a coordination compound of chloroplatinic acid and an alcohol, rhodium, and a complex of rhodium and an olefin. The catalyst (D3) may be used in an effective amount. Typically, the amount is in the range of from 0 to 5 weight %, preferably 5 to 1,000 ppm, as platinum or rhodium, based on a total weight of (A3) and (B3).

The aforesaid organopolysiloxane (A2) or (A3) may be used together with the organopolysiloxane (A1). The organopolysiloxane (A2) or (A3) may be modified with an organic resin having a polar group or hydrophilic structure such as acrylic resin, polyester resin and alkyd resin. By the modification, interaction between the organopolysiloxane and the polyvinyl alcohol homopolymer or copolymer (C), hereinafter referred to as PVA resin (C), increases to improve dispersibility of the organopolysiloxane in the composition. Further, the organopolysiloxane may be held more strongly in a film formed by PVA resin (C) to prevent worsening of the water repellency and non-tackiness with time. The amount of the resin used to modify the organopolysiloxane is adjusted depending on a type and a structure of the resin. Generally, the amount is at most 5 wt % based on a weight of the organopolysiloxane (A3) or (A2).

As the PVA resin (C) used in the present invention, any commercially available PVA resin can be used. Preferably, the specific PVA resins described below are used. A polyvinyl alcohol homopolymer is characterized mainly by degrees of polymerization and saponification. A preferred degree of polymerization of the polyvinyl alcohol homopolymer used in the present invention is such that a viscosity of a 4% aqueous solution of the homopolymer at 20 degrees C. is in the range of from 2 to 80 mPa·s, preferably from 4 to 50 mPa·s. If the homopolymer has a viscosity of the 4% aqueous solution at 20 degrees C. lower than the aforesaid lower limit, it may not form an appropriate film. If it has a viscosity higher than the aforesaid upper limit, a composition maybe difficult to apply. The degree of polymerization, i.e., the number of repeating monomer units, which corresponds roughly to the viscosity of a 4% aqueous solution at 20 degrees C. of from 2 to 80 mPa·s is in the range of from 200 to 3,000. The polyvinyl alcohol homopolymer may comprise one kind of the homopolymer or a mixture of two or more kinds of the homopolymers.

A preferred degree of saponification of the polyvinyl alcohol homopolymer used in the present invention ranges from 80 to 99.5 mole %, preferably 82 to 97 mole %. With the degree of saponification in the range, better oil repellency may easily be attained regardless of quality of paper or treatment conditions.

Preferably, a PVA resin having a higher heat distortion temperature is used. A resin having a heat distortion temperature higher than 150 degrees C. is less damaged by heat applied in paper treatment.

The polyvinyl alcohol copolymer used in the present invention is preferably a copolymer of vinyl acetate with at most 5 mole %, based on a total amount of the monomers, of another polymerizable vinyl monomer. Examples of the polymerizable vinyl monomers include methacrylates such as methyl methacrylate, propyl methacrylate and allylmethacrylate; acrylates such as methyl acrylate, and butyl acrylate; butyl vinyl ether, styrene, butene, butadiene, acrylonitrile, acrylamide, maleic anhydride and vinyl chloride.

In the copolymer, at most 5 mole % of the side chain groups may be replaced with a hydrocarbon group having 1 to 20 carbon atoms, such as alkyl groups and aryl groups, of which hydrogen atom is replaced with a silicon containing group.

To the PVA resin, various kinds of additives may be added in such an amount that they do not spoil the effects of the present invention. For example, 0.5 to 10 weight %, based on the PVA resin, of a silane coupling agent may improve adhesion of the composition to paper. Examples of the suitable silane coupling agents include 3-glycidoxypropyltrimethoxysilane, 3-glycidoxypropylmethyldimethoxysilane, 3-methacryloxypropyl trimethoxysilane, and 3-methacryloxypropylmethyldimethoxysilane.

The amount of component (C) to be incorporated ranges from 50 to 1,000 parts by weight, preferably from 60 to 900 parts by weight, per 100 parts by weight of the organopolysiloxane (A). If the amount is below the aforesaid lower limit, sufficient oil repellency may not be provided to paper. If the amount is above the aforesaid upper limit, sufficient water repellency may not be provided.

In the present invention, water (E) is used as a solvent for PVA resin (C) and a dispersion medium for hydrophobic components such as the organopolysiloxane (A). Water (E) may contain impurities found in tap water. Impurities such as a strong acid, a strong alkaline, too much alcohol and salts are undesirable because they make it difficult to disperse the hydrophobic components.

The amount of water (E) to be incorporated in the composition is not limited, but adjusted so that the composition has a viscosity suited to a coating apparatus to be used and a targeted amount of application is obtained. Generally, the amount is so adjusted that a solid content of the composition is in the range of from 1 to 20%, or in the range of 100 to 100,000 parts by weight, preferably 200 to 90,000 parts by weight, per 100 parts by weight of component (A). If the amount is below the aforesaid lower limit, it may be difficult to disperse the hydrophobic components, i.e., the components other than PVA resin(C) and surfactant (F). If it is above the aforesaid upper limit, a state of the dispersion may change with time.

In the present compositions, the aforesaid component (C) functions as a surfactant, but, the surfactant (F) is used to make the compositions more stable. Examples of the surfactant include nonionic surfactants, for example, alkyl ethers such as polyoxyethylenelauryl ether and polyoxyethylenetridecyl ether; and alkyl esters such as polyoxyethylene oleate and polyoxyethylene laurate. These nonionic surfactants may be used alone or as a mixture of two or more of them. Preferably, each of the surfactant or a mixture thereof has an HLB of from 10 to 15.

Anionic surfactants or cationic surfactants can be used. However, they are preferably used together with the aforesaid nonionic surfactants for better dispersion of the hydrophobic components.

Preferably, the amount of the surfactant (F) is a minimum amount to attain good dispersion and keep the good dispersion for a sufficient period of time. Typically, the amount of the surfactant (F) ranges from 0.1 to 100 parts by weight, preferably from 0.2 to 10 parts by weight per 100 parts by weight of the organopolysiloxane (A). If the amount is less than the aforesaid lower limit, emulsification may not be promoted. If the amount is above the aforesaid upper limit, the reaction between the organopolysiloxane (A3) and the crosslinking agent (B3) may be inhibited.

In addition to the above components, the present compositions preferably comprise the silane (G) having a hydrolyzable group and/or a condensate of partially hydrolyzed silane. The silane having a hydrolyzable group has at least 1, preferably at least 2, more preferably at least 3 hydrolyzable groups per molecule. The more the hydrolyzable groups, the greater the oil repellency.

Examples of the hydrolyzable groups include alkoxy groups such as a methoxy group, an ethoxy group, a propoxy group, a butoxy group, a methoxyethoxy group, and an isopropenoxy group; acyloxy groups such as an acetoxy group; amino groups such as an ethylamino group; amido groups; oxime groups such as ethylmethyloxime group, among which alkoxy groups are preferred.

The component (G) may have groups other than the hydrolyzable groups, preferably a monovalent hydrocarbon group having 1 to 20 carbon atoms. Examples of the monovalent hydrocarbon group include alkyl groups such as a methyl group, an ethyl group, a propyl group, and a butyl group; alicyclic groups such as a cyclohexyl group; aryl groups such as a phenyl group and a tolyl group; and alkenyl groups such as a vinyl group and a propenyl group. These groups may be a substituted group in which a part of hydrogen atoms is replaced with a substituent, for example, a halomethyl group having a halogen atom substituent, cyanoethyl group having a cyano substituent, a glycidoxypropyl group having an epoxy substituent, an aminopropyl group having an amino substituent, (meth)acryloxypropyl group having an (meth) acryl substituent, and mercaptopropyl group having a thiol substituent.

Examples of the component (G) include tetramethyl silicate, tetraethyl silicate, tetrapropyl silicate, methyltrimethoxysilane, methyltriethoxysilane, methyltripropoxysilane, dimethyldimethoxysilane, dimethyldiethoxysilane, vinyltrimethoxysilane, gamma-glycidoxypropyltrimethoxysilane, N-beta(aminoethyl)-gamma-aminopropyltrimethoxysilane, gamma-mercaptopropyltrimethoxysilane, and gamma-methacryloxypropyltrimethoxysilane.

The component (G) may be an oligosiloxane which is a condensate of hydrolyzed products of the silane having a hydrolyzable group. The oligosiloxane and the silane monomer can be used together. An advantage of using the oligosiloxane is that the amount of hydrolyzed byproducts formed in a step of preparing the composition is less and, accordingly, adverse effects of them are smaller. However, the oligosiloxane with a too high degree of polymerization may be difficult to disperse in a composition and may not much improve oil repellency of paper. An optimal average degree of polymerization is typically 50 or smaller, preferably 10 or smaller, depending on a structure of the silane.

The component (G) is incorporated in an amount of from 1 to 250 parts by weight, preferably from 2 to 200 parts by weight per 100 parts by weight of the organopolysiloxane (A). If the amount is below the aforesaid lower limit, water repellency may not be sufficiently improved. If the amount is above the aforesaid upper limit, dispersibility of the component (G) may decrease with time.

The present composition can be prepared by adding the components, except the catalyst (D), to water (E) and dispersing them homogeneously by any known method. An effective amount of the catalyst (D) may be added and dispersed homogeneously immediately before applying the composition to paper. Before added, the catalyst (D) is preferably made easy to disperse, for example, by premixing the catalyst with the surfactant (F) or emulsifying the catalyst as described below.

The organopolysiloxane (A) and the crosslinking agent (B) may be made into an aqueous emulsion and, then, mixed with the other components. The emulsion can be prepared by any known method. For example, the organopolysiloxane (A), a part of water (E) and the crosslinking agent (B) are mixed with a stirring device of high shear such as a planetary mixer and a combination mixer and, then, emulsified by phase inversion, followed by adding the rest of the component (E) to dilute the emulsion.

The amount of water (E) used for the emulsification is preferably in the range of from 100 to 400 parts by weight per 100 parts by weight of the component (A). Less than 100 parts by weight of water may not be able to disperse the component (A), while more than 400 parts by weight of water may result in dispersion worsening with time.

The silicone emulsion thus obtained is mixed in an amount of from 20 to 300 parts by weight, preferably from 5 to 100 parts by weight, as a silicone content in the emulsion per 100 parts by weight of the PVA resin(C). Then, water (E) is added to the mixture to adjust the viscosity and concentration to be suited to a method of application and a desired amount of application described below, and is stirred by a known method to prepare a homogeneously dispersed composition.

As to the silane (G) having a hydrolyzable group and/or a condensate of the partially hydrolyzed products thereof, a manner of dispersion is preferably selected as necessary, because dispersibility of the component (G) depends on a structure of the hydrolyzable group. For example, one way is to premix the component (G) with the surfactant (F) and water (E) to prepare a self-emulsifying mixture; or to prepare a solution or an emulsion of the component (G). To make the emulsion, any known emulsifying agent and method may be used. For example, one may use the surfactant (F) and the method mentioned above for emulsifying the components (A) and (B). Alternatively, the component (G) maybe emulsified together with the components (A) and (B). Besides, the component (G) may be premixed with water to hydrolyze a part or all of the hydrolyzable groups into silanol groups to improve the dispersibility, and a homogeneous aqueous solution thus formed is used to make the composition. To facilitate the homogenization, the hydrolysis may be promoted by raising a temperature or by adjusting a pH of an aqueous phase to the range of from 2 to 4 with a little amount of acid. An excessively low pH may promote condensation of the hydrolyzed products to have an adverse effect.

In addition to the above components, the present compositions can contain known components in such an amount that these components do not spoil the objects of the present invention, say, 5 wt % or less based on a weight of the composition, though it varies depending on each component. Examples of the components include catalyst activity suppressors to suppress activities of the platinum metal catalysts such as organic nitrogen compounds, organic phosphorous compounds, acetylene derivatives, oxime compounds and organic halides; components to control non-tackiness such as silicone resins, silica and organopolysiloxanes without SiH group or alkenyl groups; leveling agents; thickeners such as water soluble polymers, for example, cellulose derivatives such as methyl cellulose and starch derivatives; and components to improve film forming property of the composition such as styrene-maleic anhydride copolymer. These can be added as required.

To apply the present composition on paper, a method of application can be selected from the commonly used methods according to viscosity of a coating solution and coating speed, for example, application by a coater such as a calendar coater, a gravure coater, an air-knife coater, a roll coater, and a wire bar and spray coating. An amount of the composition to be applied may be, as a solid content, 0.1 g/m$^2$ or more, preferably from 1 to 5g/m$^2$. If the amount is below the aforesaid lower limit, it may be difficult to keep good oil repellency of paper. If the amount is above the aforesaid upper limit, only a little improvement may be attained, which is disadvantageous in costs.

After application, treated paper is passed through a dryer to be heated to dryness and a water- and oil-repellent paper is obtained. The drying by heating may generally be performed at a temperature of 140 degrees C. or higher for at least 10 seconds.

EXAMPLES

The present invention will be explained with reference to the following non-limiting Examples and Referential Examples.

A. Preliminary Preparation

Preparation Example 1

One hundred parts by weight of a PVA resin having a degree of saponification of 90 mole % and a viscosity in a 4% aqueous solution at 20 degrees C. of 30 mPa·s, and 900 parts by weight of water were mixed. The mixture was stirred until it became a homogeneous solution to prepare a 10% aqueous solution of the PVA resin.

Preparation Example 2

One hundred parts by weight of a PVA resin having a degree of saponification of 80 mole % and a viscosity in a 4% aqueous solution at 20 degrees C. of 5 mPa·s, and 900 parts by weight of water were mixed. The mixture was stirred until it became a homogeneous solution to prepare a 10% aqueous solution of the PVA resin.

Preparation Example 3

One hundred parts by weight of a PVA resin having a degree of saponification of 98 mole % and a viscosity in a 4% aqueous solution at 20 degrees C. of 60 mPa·s, and 900 parts by weight of water were mixed. The mixture was stirred until it became a homogeneous solution to prepare a 10% aqueous solution of the PVA resin.

Preparation Example 4

In a 5-liter complex emulsifier provided with an anchor like shape stirrer capable of agitating entire contents of the emulsifier and a rotatable disk having small projections of a tooth like shape directed alternately upwards and lowerwards, there were placed the organopolysiloxane (A2) of the following formula having a viscosity at 25 degrees C. of 2 Pa·s and a silanol group content of 0.01 mole/100 g,

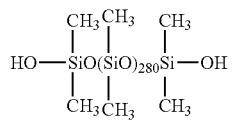

3 parts by weight of the methylhydrogenpolysiloxane (B2) of the following formula having a viscosity of 25 mPa·s and an SiH content of 1.5 moles/100 g,

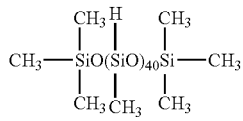

1 part by weight of polyoxyethylene lauryl ether having an HLB of 13.6 as a surfactant, and 50 parts by weight of the 10% aqueous solution of the PVA resin prepared in Preparation Example 1 and stirred to make a homogeneous mixture. To the mixture, 10 parts by weight of water were added to cause phase inversion and stirred for additional 30 minutes. Then, 836 parts by weight of water were added to prepare a 10% oil-in-water type emulsion.

Preparation Example 5

In a complex emulsifier as used in the preparation example 4, there were placed 100 parts by weight of the polyorganosiloxane (A3) represented by the following formula having a viscosity at 25 degrees C. of 0.4 Pa·s and a vinyl group content of 0.03 mole/100 g,

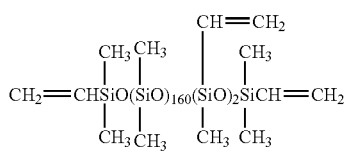

6 parts by weight of the methylhydrogenpolysiloxane (B3) represented by the following formula having a viscosity of 0.25 mPa·s and an SiH content of 1.5 moles/100 g,

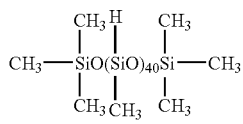

1 part by weight of polyoxyethylene lauryl ether having an HLB of 13.6 as a surfactant, 50 parts by weight of the 10% aqueous solution of the PVA resin prepared in Preparation Example 1, and 0.4 part by weight of ethynylcyclohexanol as a catalytic activity suppressor and stirred to make a homogeneous mixture. To the mixture, 10 parts by weight of water were added to cause phase inversion and stirred for additional 30 minutes. Then, 833 parts by weight of water were added to prepare a 10% oil-in-water type emulsion.

Preparation Example 6

In a complex emulsifier as used in the preparation example 4, there were placed 100 parts by weight of the polyorganosiloxane (A1) represented by the following formula having a viscosity at 25 degrees C. of 2 Pa·s,

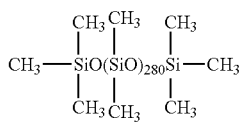

1 part by weight of polyoxyethylene lauryl ether having an HLB of 13.6 as a surfactant, and 50 parts by weight of the 10% aqueous solution of the PVA resin prepared in Preparation Example 1 and stirred to make a homogeneous mixture. To the mixture, 10 parts by weight of water were added to cause phase inversion and stirred for additional 30 minutes. Then, 839 parts by weight of water were added to prepare a 10% oil-in-water type emulsion.

B. Preparation of a Composition

Example 1

In a mixer, 200 parts by weight of the aqueous PVA resin solution prepared in Preparation Example 1, 100 parts by weight of the silicone emulsion prepared in Preparation Example 4, and 0.1 part by weight of sodium carbonate, corresponding to 0.5% by weight based on the silicone components, were mixed to prepare a composition.

Example 2

A composition was prepared by mixing 1,000 parts by weight of the aqueous PVA resin solution prepared in Preparation Example 1, 100 parts by weight of the silicone emulsion prepared in Preparation Example 5, and 1 part by weight of a platinum catalyst emulsion, CAT-PM-10A, ex Shin-Etsu Chemical Co., corresponding to 100 ppm, as platinum, based on the weight of the silicone components.

Example 3

A composition was prepared by mixing 200 parts by weight of the aqueous PVA resin solution prepared in Preparation Example 1, 100 parts by weight of the silicone emulsion prepared in Preparation Example 5, and 1 part by weight of CAT-PM-10A, corresponding to 100 ppm, as platinum, based on the weight of the silicone components.

Example 4

A composition was prepared by mixing 50 parts by weight of the aqueous PVA resin solution prepared in Preparation Example 1, 100 parts by weight of the silicone emulsion prepared in Preparation Example 5, and 1 part by weight of CAT-PM-10A, corresponding to 100 ppm, as platinum, based on the weight of the silicone components.

Example 5

A composition was prepared by mixing 200 parts by weight of the aqueous PVA resin solution prepared in Preparation Example 2, 100 parts by weight of the silicone emulsion prepared in Preparation Example 5, and 1 part by weight of CAT-PM-10A, corresponding to 100 ppm, as platinum, based on the weight of the silicone components.

Example 6

A composition was prepared by mixing 200 parts by weight of the aqueous PVA resin solution prepared in Preparation Example 3, 100 parts by weight of the silicone emulsion prepared in Preparation Example 5, and 1 part by weight of CAT-PM-10A, corresponding to 100 ppm, as platinum, based on the weight of the silicone components.

Example 7

A composition was prepared by mixing 200 parts by weight of the aqueous PVA resin solution prepared in Preparation Example 1, and 100 parts by weight of the silicone emulsion prepared in Preparation Example 6.

Example 8

A composition was prepared by well mixing 200 parts by weight of the aqueous PVA resin solution prepared in Preparation Example 1, 100 parts by weight of the silicone emulsion prepared in Preparation Example 4, and 3 parts by weight of tetraethoxysilane as the component (G).

Example 9

A composition was prepared by well mixing 200 parts by weight of the aqueous PVA resin solution prepared in Preparation Example 1, 100 parts by weight of the silicone emulsion prepared in Preparation Example 5, 3 parts by weight of methyltriethoxysilane as the component (G), and 1 part by weight of a platinum catalyst emulsion, CAT-PM-10A, ex Shin-Etsu Chemical Co., corresponding to 100 ppm, as platinum, based on the weight of the silicone components.

Example 10

A composition was prepared by well mixing 200 parts by weight of the aqueous PVA resin solution prepared in Preparation Example 1, 100 parts by weight of the silicone emulsion prepared in Preparation Example 5, 3 parts by weight of a condensate of tetraethoxysilane having an average degree of condensation of 2 as the component (G), and 1 part by weight of CAT-PM-10A.

Example 11

A composition was prepared by well mixing 1,000 parts by weight of the aqueous PVA resin solution prepared in Preparation Example 1, 100 parts by weight of the silicone emulsion prepared in Preparation Example 5, 25 parts by weight of tetraethoxysilane, and 1 part by weight of a CAT-PM-10A.

Example 12

A composition was prepared by well mixing 50 parts by weight of the aqueous PVA resin solution prepared in Preparation Example 1, 100 parts by weight of the silicone emulsion prepared in Preparation Example 5, 0.1 part by weight of tetraethoxysilane, and 1 part by weight of CAT-PM-10A.

Example 13

A composition was prepared by well mixing 200 parts by weight of the aqueous PVA resin solution prepared in Preparation Example 2, 100 parts by weight of the silicone emulsion prepared in Preparation Example 5, 3 parts by weight of tetraethoxysilane and 1 part by weight of CAT-PM-10A.

Example 14

A composition was prepared by well mixing 200 parts by weight of the aqueous PVA resin solution prepared in Preparation Example 3, 100 parts by weight of the silicone emulsion prepared in Preparation Example 5, 3 parts by weight of tetraethoxysilane and 1 part by weight of CAT-PM-10A.

Referential Example 1

A composition was prepared by well mixing 1,200 parts by weight of the aqueous PVA resin solution prepared in Preparation Example 1, 100 parts by weight of the silicone emulsion prepared in Preparation Example 5, and 1 part by weight of CAT-PM-10A, corresponding to 100 ppm, as platinum, based on the weight of the silicone components.

Referential Example 2

A composition was prepared by well mixing 30 parts by weight of the aqueous PVA resin solution prepared in Preparation Example 1, 100 parts by weight of the silicone emulsion prepared in Preparation Example 5, and 1 part by weight of CAT-PM-10A, corresponding to 100 ppm, as platinum, based on the weight of the silicone components.

Referential Example 3

A composition was prepared by well mixing 200 parts by weight of the aqueous PVA resin solution prepared in Preparation Example 1, 100 parts by weight of the silicone emulsion prepared in Preparation Example 5, and 1 part by weight of CAT-PM-10A.

Referential Example 4

A composition was prepared by well mixing 200 parts by weight of the aqueous PVA resin solution prepared in Preparation Example 1, 100 parts by weight of the silicone emulsion prepared in Preparation Example 5, 0.05 part by weight of tetraethoxysilane and 1 part by weight of CAT-PM-10A.

Referential Example 5

A composition was prepared by well mixing 200 parts by weight of the aqueous PVA resin solution prepared in Preparation Example 1, 100 parts by weight of the silicone emulsion prepared in Preparation Example 5, 27 parts by weight of tetraethoxysilane and 1 part by weight of CAT-PM-10A.

Referential Example 6

A composition was prepared by well mixing 1,200 parts by weight of aqueous PVA resin solution prepared in Preparation Example 1, 100 parts by weight of the silicone emulsion prepared in Preparation Example 5, 3 parts by weight of tetraethoxysilane and 1 part by weight of CAT-PM-10A.

Referential Example 7

A composition was prepared by well mixing 30 parts by weight of the aqueous PVA resin solution prepared in Preparation Example 1, 100 parts by weight of the silicone emulsion prepared in Preparation Example 5, and 1 part by weight of CAT-PM-10A.

C. Preparation of Water- and Oil-Repellent Paper

Each composition prepared in the Examples and the Referential Examples was applied with a bar coater to a sheet of commercially available craft paper of 50 g/m² in such an amount that a solid content of the composition was 2 g/m². The paper was then heated in a dryer at 140 degrees C. for 30 seconds to prepare a sheet of water- and oil-repellent paper.

D. Methods of Evaluation

Stability of Dispersion

After each composition was allowed to stand for 1 week at room temperature, its appearance was visually observed and rated according to the following criteria.

A: Not separated
B: A little separated
C: Separated

Oil Repellency

Oil repellency of the paper was evaluated with a 3M kit test, TAPPI-RC-338, ex 3M Corp. In the test, a drop of test oils with various kit numbers, containing castor oil, toluene, and heptane in various ratios, are placed on paper and observed whether it penetrates the paper or not. Oil repellency of the paper is represented by the test oil of the maximum kit number which did not penetrate the paper. The greater the kit number, the better the oil repellency. The oil repellency was rated according to the following criteria for the maximum kit number.

"A": 13 or larger.
"B": 12
"C": 8 to 11
"D": 7 or smaller

Water Repellency

A contact angle of a drop of water on paper was measured. The larger the contact angle, the better the water repellency. The water repellency was rated according to the following criteria for the contact angle.

"A": 100 degrees or larger
"B": 90 degrees or larger and smaller than 100 degrees
"C": smaller than 90 degrees Non-Tackiness On paper, a tape of 50 mm in width was put, to which a load of 20 g/cm² was then applied. After aged at 70 degrees C. for 20 hours, the tape was peeled off in a direction of 180 degrees and a force required to peel off was measured with an autograph. The non-tackiness of the paper was rated according to the following criteria for the force.

A: 1 N or smaller
B: Larger than 1N

Extraction Test

A treated paper of 10 cm² was soaked in 20 ml of distilled water at 60 degrees C. for 30 minutes, and then subjected to filtration to prepare a test solution. In an Erlenmeyer flask, 10 ml of the test solution, 0.5 ml of sulfuric acid, and 1 ml of a 0.002 mole/l potassium permanganate solution were placed and boiled for 5 minutes, to which 1 ml of a 0.01 mole/l sodium oxalate solution was then added and titration was carried out with a 0.002 mole/l potassium permanganate solution to an end point showing pale red color. Blank titration was run on 10 ml of distilled water. A potassium permanganate consumption was calculated according to the following equation.

Potassium permanganate consumption (ppm)=[(titer for the test solution (ml)−titer for the blank (ml)]×31.6

A smaller potassium permanganate consumption means better water repellency and stronger resistance to water.

E. Evaluation Results

The results are as shown in the following Tables 1 and 2.

TABLE 1

|  |  | Example 1 | Example 2 | Example 3 | Example 4 | Example 5 | Example 6 | Example 7 | Ref. Example 1 | Ref. Example 2 |
|---|---|---|---|---|---|---|---|---|---|---|
| (A) organopolysiloxane | | 10 | 10 | 10 | 10 | 10 | 10 | 10 | 10 | 10 |
| (B) crosslinking agent | | 0.3 | 0.6 | 0.6 | 0.6 | 0.6 | 0.6 | | 0.6 | 0.6 |
| (C) PVA resin | | 20 | 100 | 20 | 5 | 20 | 20 | 20 | 120 | 3 |
| (D) catalyst | | | 1 | 1 | 1 | 1 | 1 | | 1 | 1 |
| (E) water | | 269.6 | 989.3 | 296.3 | 134.3 | 296.3 | 296.3 | 269.9 | 1169.3 | 116.3 |
| (F) surfactant | | 0.1 | 0.1 | 0.1 | 0.1 | 0.1 | 0.1 | 0.1 | 0.1 | 0.1 |
| Sodium carbonate | | 0.1 | | | | | | | | |
| Evaluation results | Stability | A | A | A | A | A | B | A | A | A |
| | Oil repellency | B | B | B | C | C | C | C | B | D |
| | Water repellency | A | A | A | A | A | B | B | C | A |
| | Non-tackiness | A | A | A | A | A | A | A | B | A |

TABLE 2

|  |  | Ex. 8 | Ex. 9 | Ex. 10 | Ex. 11 | Ex. 12 | Ex. 13 | Ex. 14 | Ref. Example 3 | Ref. Example 4 | Ref. Example 5 | Ref. Example 6 | Ref. Example 7 |
|---|---|---|---|---|---|---|---|---|---|---|---|---|---|
| (A) organopolysiloxane | | 10 | 10 | 10 | 10 | 10 | 10 | 10 | 10 | 10 | 10 | 10 | 10 |
| (B) crosslinking agent | | 0.3 | 0.6 | 0.6 | 0.6 | 0.6 | 0.6 | 0.6 | 0.6 | 0.6 | 0.6 | 0.6 | 0.6 |
| (C) PVA resin | | 20 | 20 | 20 | 100 | 5 | 20 | 20 | 20 | 20 | 20 | 120 | 3 |
| (D) catalyst | | | 1 | 1 | 1 | 1 | 1 | 1 | 1 | 1 | 1 | 1 | 1 |
| (E) water | | 269.6 | 269.3 | 269.3 | 989.3 | 134.3 | 269.3 | 269.3 | 269.3 | 269.3 | 269.3 | 1169.3 | 116.3 |
| (F) surfactant | | 0.1 | 0.1 | 0.1 | 0.1 | 0.1 | 0.1 | 0.1 | 0.1 | 0.1 | 0.1 | 0.1 | 0.1 |
| (G) tetraethoxysilane | | 3 | | | 25 | 0.1 | 3 | 3 | | | 0.05 | 27 | 3 | 3 |
| (G) tetraethoxysilane dimer | | | | 3 | | | | | | | | | |
| (G) methyltrimethoxy silane | | | 3 | | | | | | | | | | |
| Evaluation results | Stability | A | A | A | A | A | A | A | A | A | C | A | A |
| | Oil repellency | A | A | A | A | B | A | A | B | B | A | A | D |
| | Water repellency | A | A | A | A | A | A | A | A | A | A | C | A |
| | Non-tackiness | A | A | A | A | A | A | A | A | A | A | B | A |
| | KMnO$_4$ consumption (ppm) | 2 | 1 | 1 | 1 | 3 | 2 | 1 | 8 | 8 | 1 | 3 | 1 |

INDUSTRIAL APPLICABILITY

As can be seen from Table 1 and 2, the present silicone composition is useful as a treatment agent to provide paper with water repellency, oil repellency and non-tackiness.

The invention claimed is:

1. A composition comprising the following components:
   100 parts by weight of an organopolysiloxane (A),
   0.1 to 30 parts by weight of a crosslinking agent (B),
   50 to 1,000 parts by weight of a polyvinyl alcohol homopolymer or copolymer (C),
   0 to 5 parts by weight, as an active ingredient, of a catalyst (D),
   100 to 100,000 parts by weight of water (E),
   0.1 to 100 parts by weight of a surfactant (F), and
   1 to 250 parts by weight of a silane (G) containing a hydrolyzable group, at least part of the silane (G) having been converted to silanol by mixing the silane (G) with water (E) prior to adding the silane (G) to other components, and/or a silanol containing condensate of such a silanol with a degree of polymerization of 2,
   wherein
   component (A) is a mixture of an organopolysiloxane (A2) having at least two hydroxyl groups and represented by the following average compositional formula (2):

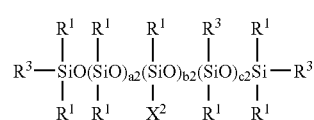
(2)

wherein each $R^1$ may be same or different and is a group having 1 to 20 carbon atoms selected from the group consisting of alkyl groups, alicyclic groups, and aryl groups, whose hydrogen atoms bonded to the carbon atoms may partly be replaced with a halogen atom or a cyano group, $R^3$ is a hydroxyl group, and $X^2$ is the group represented by the following formula:

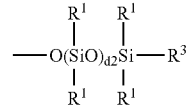

wherein a2, b2, c2 and d2 are such numbers that the organopolysiloxane (A2) has a viscosity at 25 degrees C. of from 0.05 to 500 Pa·s, and b2, c2 and d2 may be zero, and an organopolysiloxane (A1) represented by the following average compositional formula (1):

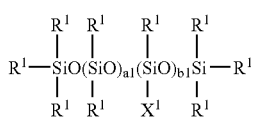

(1)

wherein each $R^1$ may be same or different and is a group having 1 to 20 carbon atoms selected from the group consisting of alkyl groups, alicyclic groups, and aryl groups, whose hydrogen atoms bonded to the carbon atoms may partly be replaced with a halogen atom or a cyano group, and $X^1$ is the group represented by the following formula:

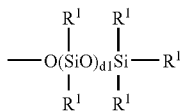

wherein a1, b1 and d1 are such numbers that the organopolysiloxane (A1) has a viscosity at 25° C. of from 0.05 to 500 Pa·s, and b1 and d1 may be zero, and component (B) is an organopolysiloxane (B2) having at least three SiH or hydrolyzable groups per molecule.

2. The composition according to claim 1, wherein the organopolysiloxane (B2) is represented by the following formula: $R^1{}_f H_g SiO_{(4-f-g)/2}$, or $R^1{}_f W_g SiO_{(4-f-g)/2}$ wherein $R^1$ is as defined above, W is a hydrolyzable group, f and g are numbers with $0 \leq f \leq 3$, $0 < g \leq 3$, and $1 \leq f+g \leq 3$.

3. The composition according to claim 2, wherein W is at least one selected from the group consisting of alkoxy groups, acyloxy groups, amino groups, amido groups and oxime groups.

4. The composition according to claim 1, wherein the hydrolyzable group of the component (G) is selected from the group consisting of alkoxy groups, acyloxy groups, and oxime groups.

5. The composition according to any one of claims 1 to 3, wherein the component (C) is a polyvinyl alcohol copolymer of a vinyl acetate monomer with a co-monomer of 5 mole % or smaller based on a total amount of the monomer and the co-monomer.

6. The composition according to claim 5, wherein the co-monomer is at least one selected from the group consisting of acrylic acid and derivatives thereof, methacrylic acid and derivatives thereof, styrene and derivatives thereof, alkenes having 4 carbon atoms, maleic anhydride and vinyl chloride.

7. The composition according to any one of claims 1 to 3, wherein the component (C) is at least one kind of polyvinyl alcohol homopolymer having a viscosity in a 4% aqueous solution at 20° C. of 2 to 80 mPa·s and a degree of saponification of from 80 to 99.5 mole %.

8. A paper treatment agent comprising the composition according to any one of claims 1 to 3.

9. Paper treated with a paper treatment agent comprising a composition comprising the following components:

100 parts by weight of an organopolysiloxane (A),
0.1 to 30 parts by weight of a crosslinking agent (B),
50 to 1,000 parts by weight of a polyvinyl alcohol homopolymer or copolymer (C),
0 to 5 parts by weight, as an active ingredient, of a catalyst (D),
100 to 100,000 parts by weight of water (E), 0.1 to 100 parts by weight of a surfactant (F), and
1 to 250 parts by weight of a silane (G) containing a hydrolyzable group, at least part of the silane (G) having been converted to silanol by mixing the silane (G) with water (E) prior to adding the silane (G) to other components, and/or a silanol containing condensate of such a silanol with a degree of polymerization of 2, wherein component (A) is a mixture of an organopolysiloxane (A2) having at least two hydroxyl groups and represented by the following average compositional formula (2):

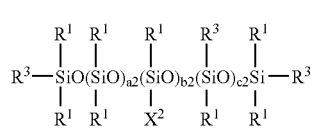

(2)

wherein each $R^1$ may be same or different and is a group having 1 to 20 carbon atoms selected from the group consisting of alkyl groups, alicyclic groups, and aryl groups, whose hydrogen atoms bonded to the carbon atoms may partly be replaced with a halogen atom or a cyano group, $R^3$ is a hydroxyl group, and $X^2$ is the group represented by the following formula:

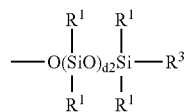

wherein a2, b2, c2 and d2 are such numbers that the organopolysiloxane (A2) has a viscosity at 25 degrees C. of from 0.05 to 500 Pa·s, and b2, c2 and d2 may be zero, and an organopolysiloxane (A1) represented by the following average compositional formula (1):

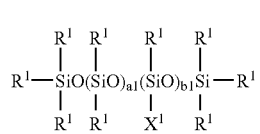

(1)

wherein each $R^1$ may be same or different and is a group having 1 to 20 carbon atoms selected from the group consisting of alkyl groups, alicyclic groups, and aryl groups, whose hydrogen atoms bonded to the carbon atoms may partly be replaced with a halogen atom or a cyano group, and $X^1$ is the group represented by the following formula:

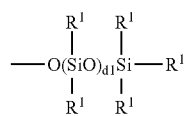

wherein a1, b1 and d1 are such numbers that the organopolysiloxane (A1) has a viscosity at 250° C. of from 0.05 to 500 Pa·s, and b1 and d1 may be zero, and component (B) is an organopolysiloxane (B2) having at least three SiH or hydrolyzable groups per molecule.

10. The paper according to claim 9, wherein the organopolysiloxane (B2) is represented by the following formula: $R^1_f H_g SiO_{(4-f-g)/2}$, or $R^1_f W_g SiO_{(4-f-g)/2}$ wherein $R^1$ is as defined above, W is a hydrolyzable group, f and g are numbers with $0 \leq f \leq 3$, $0 < g \leq 3$, and $1 \leq f+g \leq 3$.

11. The composition according to claim 10, wherein W is at least one selected from the group consisting of alkoxy groups, acyloxy groups, amino groups, amido groups and oxime groups.

* * * * *